United States Patent [19]

Kato

[11] Patent Number: 5,371,452
[45] Date of Patent: Dec. 6, 1994

[54] ADJUSTABLE TIME CONSTANT CONTROL AND METHOD SYSTEM FOR A SERVOMOTOR

[75] Inventor: Tetsuaki Kato, Minamitsuru, Japan
[73] Assignee: Fanuc Ltd., Yamanachi, Japan
[21] Appl. No.: 233,500
[22] PCT Filed: Apr. 28, 1992
[86] PCT No.: PCT/JP92/00563
   § 371 Date: Dec. 16, 1992
   § 102(e) Date: Dec. 16, 1992
[87] PCT Pub. No.: WO92/21074
   PCT Pub. Date: Nov. 26, 1992

Related U.S. Application Data

[63] Continuation of Ser. No. 955,707, Dec. 16, 1992, abandoned.

[30] Foreign Application Priority Data

May 10, 1991 [JP] Japan .................. 3-135660

[51] Int. Cl.$^5$ .................. G05B 19/407; G05D 3/12
[52] U.S. Cl. .................. 318/610; 318/568.15; 318/615
[58] Field of Search .................. 318/560-646, 318/430-434; 187/103

[56] References Cited

U.S. PATENT DOCUMENTS

| | | | |
|---|---|---|---|
| 4,500,823 | 2/1985 | Walrath | 318/632 |
| 4,554,497 | 11/1985 | Nozawa et al. | 318/561 |
| 4,556,830 | 12/1985 | Schwalm et al. | 318/326 |
| 4,603,286 | 7/1986 | Sakano | 318/615 |
| 4,652,806 | 3/1987 | Kawamura et al. | 318/590 |
| 4,706,003 | 11/1987 | Nakashima et al. | 318/636 X |
| 4,728,872 | 3/1988 | Kishi et al. | 318/587 X |
| 4,743,822 | 5/1988 | Futami et al. | 318/610 |
| 4,748,555 | 5/1988 | Miyake et al. | 318/567 X |
| 4,894,596 | 1/1990 | Hara | 318/568.1 |
| 4,916,636 | 4/1990 | Torii et al. | 318/568.18 |
| 4,988,934 | 1/1991 | Toyoda et al. | 318/568.15 |
| 5,004,968 | 4/1991 | Mizuno et al. | 318/615 |
| 5,159,254 | 10/1992 | Teshima | 318/611 |
| 5,202,611 | 4/1993 | Uehara et al. | 318/590 X |
| 5,204,602 | 4/1993 | Iwashita | 318/630 |

FOREIGN PATENT DOCUMENTS 62-251810 11/1987 Japan .
64-36303 2/1989 Japan .

*Primary Examiner*—Paul Ip
*Attorney, Agent, or Firm*—Staas & Halsey

[57] ABSTRACT

An adjustable time constant control system for a servomotor, determines the optimum adjustable time constant for a servomotor based on a moving amount, load, or the like, for every block of a machining program to reduce the machining time required by the adjustable time constant control system. A determination as to whether a velocity reaches a command velocity (Vt) is made based on the distance to a target moving position (step S1). If the velocity reaches the command velocity ($V_t$), the command velocity ($V_t$), the command velocity (Vt) is used as a velocity (V) (step S2). On the other hand, if the velocity does not reach the command velocity ($V_t$), a reaching velocity (Vu) is calculated (step S3), and the calculated value is used as a velocity (V) (step S4). Further, the maximum torque (Tmax) corresponding to the velocity (V) is determined from the torque curve (step S5), and an accelerating torque (Ta) is calculated based on the maximum torque (Tmax) (step S6). Furthermore, acceleration (a) is calculated (step S7), and an adjustable time constant ($\tau$) is calculated based on the acceleration (a) and the velocity (V) (step S8). The largest one of the adjustable time constants ($\tau$) of all drive shafts is determined as an adjustable time constant for each shaft (step S9). Therefore, the optimum adjustable time constant can be determined, to reduce the machining time required by the adjustable time constant control system.

6 Claims, 4 Drawing Sheets

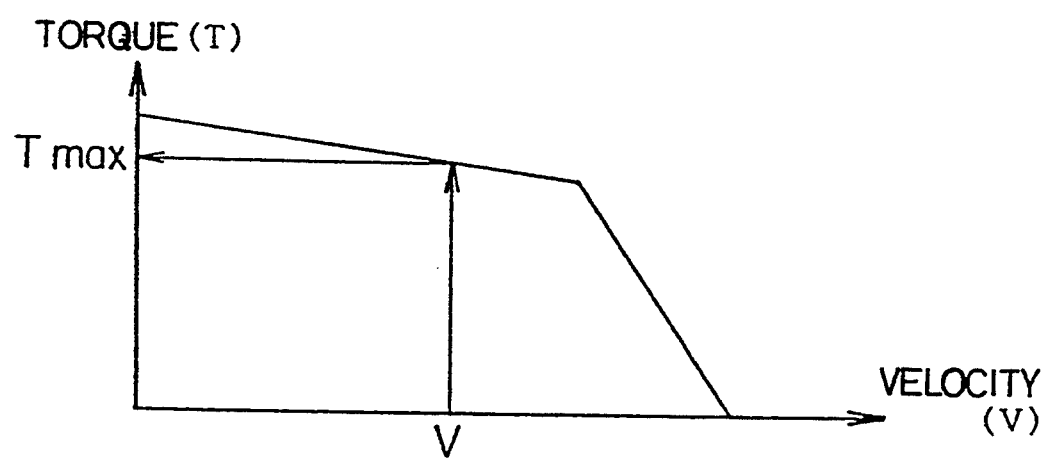
F I G. 3

ADJUSTABLE TIME CONSTANT CONTROL AND METHOD SYSTEM FOR A SERVOMOTOR

This application is a continuation of application Ser. No. 07/955,707, filed Dec. 16, 1992, now abandoned.

CROSS-REFERENCE TO RELATED APPLICATIONS

The present application is related to U.S. patent application Ser. Nos. 07/855,002, 07/870,881 and 07/776,418.

BACKGROUND OF THE INVENTION

1. Field of the Invention

The present invention relates to an adjustable time constant control system for a servomotor, which controls operations of movable parts in a machine tool while determining accelerating and decelerating time constants, and in particular, to an adjustable time constant control system, which controls movable parts in a machine tool while determining the optimum adjustable time constant every block, 2. Description of the Related Art In an adjusting operation of a numerical control unit in the field, an accelerating time constant and decelerating time constant for each servomotor are preset, each servomotors being operable to drive a corresponding one of respective drive shafts or axes, Hereinafter, a term "adjustable time constant" is used, which includes the accelerating and decelerating time constants. The adjustable time constant is greatly influenced by the conditions in which the numerical control unit is operated. This makes it difficult to uniformly determine the adjustable time constant. For this reason, the adjustable time constant is conventionally determined on the basis of judgment in experience, a tentative operation, or the like.

However, if the time constant is determined with a sufficient margin, a cycle time becomes long, conversely, if it is determined to a small value, positioning accuracy is lowered due to generation of vibration, or the like. Therefore, the time constant must be determined to an appropriate value, but it is difficult to find the objective standard of judgment in a short time. For this reason, in controlling movable parts in the machine tool by using an adjustable time constant with a sufficient margin, it is hard to improve an operation speed even if there is a sufficient margin of power in a torque generated by the servomotor.

SUMMARY OF THE INVENTION

The present invention has been made in view of the above circumstances. Therefore, an object of the present invention is to provide an adjustable time constant control system for a servomotor, which determines an optimum adjustable time constant of the servomotor with respect to a moving amount, load, or the like.

In order to solve the above problems, according to the present invention, there is provided an adjustable time constant control system, which controls an operation of a machine tool while determining an optimum adjustable time constant of the servomotor every block, comprising the steps of: determining an output torque of the servomotor on the basis of a programmed velocity; determining an accelerating torque by subtracting a static load torque from said output torque; determining acceleration on the basis of said acceleration torque and load inertia of the servomotor; and determining an adjustable time constant on the basis of said acceleration.

The output torque of the servomotor is determined on the basis of the programmed velocity and a velocity vs. torque curve of the servomotor from which a viscous loss is previously subtracted, An accelerating torque for accelerating the load is obtained by subtracting the static load torque including a frictional torque, a gravity torque, or the like, from the output torque. Further, an adjustable time constant is determined on the basis of the accelerating torque, and thus, acceleration or deceleration of the machine tool is controlled.

BRIEF DESCRIPTION OF THE DRAWINGS

FIG. 3 is a graph showing the relationship between the velocity and torque of the servomotor.

DESCRIPTION OF THE PREFERRED EMBODIMENTS

An embodiment of the present invention will be hereinafter described with reference to the drawings.

Figure 2:
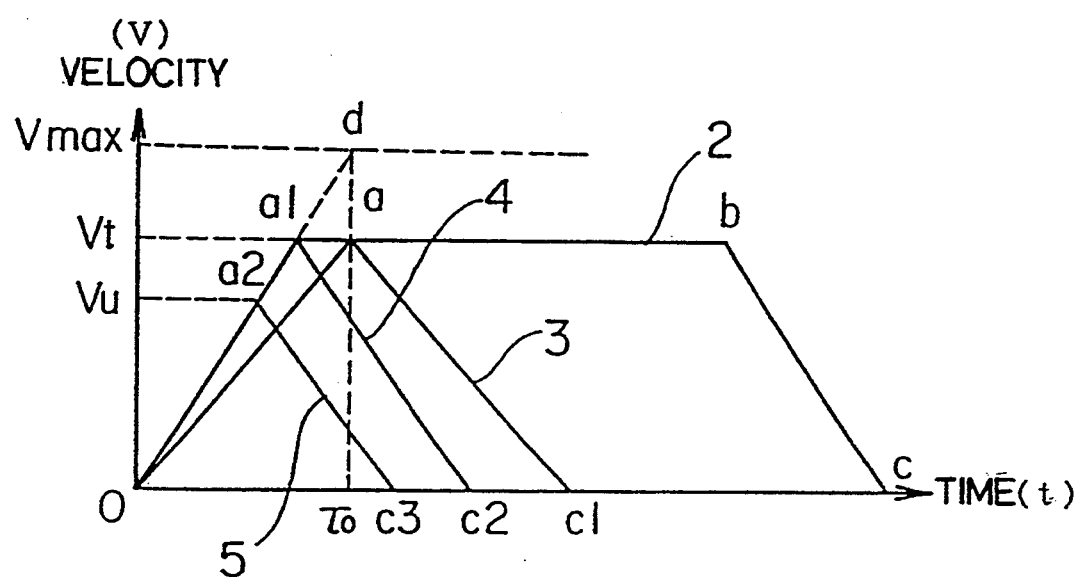
FIG. 2 is a graph showing the relationship between a moving distance and achievable velocity of each shaft in a machine tool.

FIG. 2 is a graph showing the relationship between a moving distance of each drive shaft or axis in a machine tool and an achievable velocity. In FIG. 2, time is plotted along the abscissas, while velocity is plotted along the ordinate. When the moving distance (or an angle of rotation) is great considerably, respective points o, a, b, and c are passed as shown by a line 2. In concrete, the acceleration is made at a time constant $\tau_0$ until the point a is reached, the movement is made at a commanded velocity Vt, and then the deceleration made for stoppage at the point c. Thus, the section surrounded by the lines connecting the points o, a, b, c, and o is equivalent to the moving distance. If the moving distance is short, the time interval between the points a and b, in which time interval the velocity is fixed, becomes short. The state where the length between the points a and b is greater than zero is referred to as a long motion, while the state where the length between the points a and b is equal to or less than zero is referred to as a short motion. At the boundary between the long and short motions, the locus of o-a-c1 shown by a line 3 is drawn.

If the moving distance becomes further short, the acceleration is varied up to a straight line od defined by the time constant $\tau_0$ and the maximum velocity Vmax, and thus, o-a1-c2 shown by a line 4 is obtained. Further, if the moving distance becomes still shorter, o-a2-c3 shown by a line 5 is obtained. The maximum velocity at this moment becomes Vu, which is referred to as a reaching velocity or ultimate velocity.

FIG. 3 is a graph showing the relationship between the velocity and torque of a servomotor. In FIG. 3, velocity (V) is plotted along the abscissa, while torque (T) is plotted along the ordinate. If a specified velocity is determined, the maximum torque Tmax corresponding thereto is determined. The data indicating the relationship is stored in a numerical control unit for every servomotor of the machine tool.

Assuming that positions from a first to third shafts of the machine tool are determined as $P_1$ to $P_3$, respectively, and a weight of a workpiece is determined as W, inertia of each shaft and static load torque can be expressed by the following equations. In this case, the static load torque includes a frictional torque and a gravity torque.

Here, assuming that inertia of the first to third shafts are determined as $I_1$, $I_2$, and $I_3$, respectively, and further, the static load of the first to third shafts are determined as $T_{w1}$, $T_{w2}$ and $T_{w3}$, respectively, these values can be obtained by the following equations:

$$I_1 = F_1(P_1, P_2, P_3, W)$$

$$I_2 = F_2(P_1, P_2, P_3, W)$$

$$I_3 = F_3(P_1, P_2, P_3, W)$$

$$T_{w1} = G_1(P_1, P_2, P_3, W)$$

$$T_{w2} = G_2(P_1, P_2, P_3, W)$$

$$T_{w3} = G_3(P_1, P_2, P_3, W)$$

These functions $F_1$ to $F_3$ and $G_1$ to $G_3$ are calculated on the basis of the construction of the machine tool. Therefore, when the machine is in tool a specified state, these inertia $I_1$ to $I_3$ and static load torques $T_{w1}$ to $T_{w3}$ are obtained by calculation in the numerical control unit.

In this case, these inertia and static load torques with respect to the moving current position $P_n$ and target position $P_{n+1}$ are sequentially calculated during the operation of NC programs. W is commanded by the NC programs.

Figure 4:
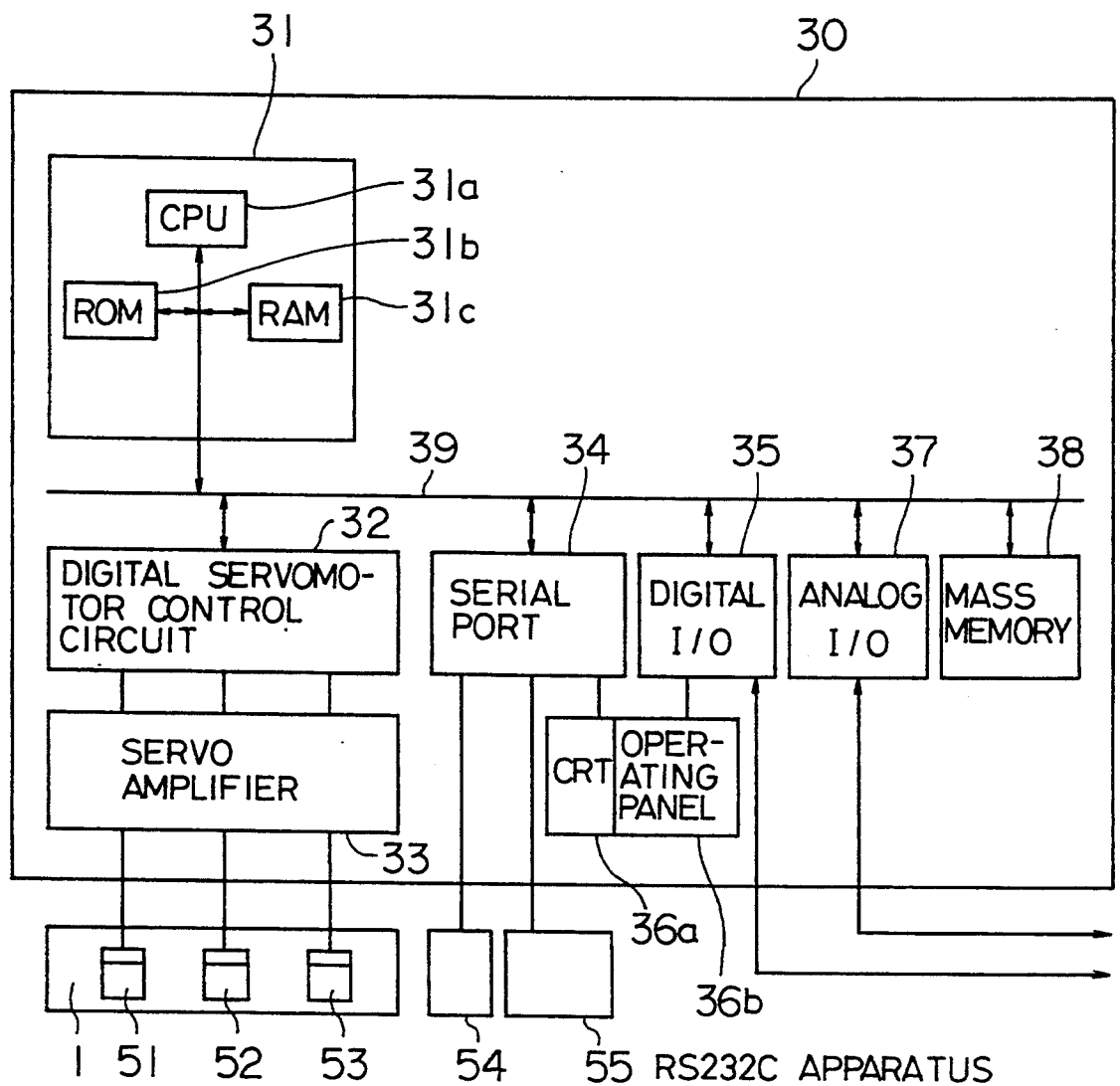
FIG. 4 is a schematic block diagram of a numerical control unit for carrying out the present invention.

FIG. 4 is a schematic block diagram of a numerical control unit for carrying out the present invention. The numerical control unit 30 includes a processor board 31 which comprises a processor 31a, a ROM 31b, and a RAM 31c. The processor 31a globally controls the numerical control unit 30 according to system programs stored in the ROM 31b. Data such as W mentioned above, NC programs, and the like are stored in the RAM 31c. A part of the RAM comprises a nonvolatile memory in which these data, NC programs, and the like are stored. The processor board 31 is connected to a bus 39.

A digital servomotor control circuit 32 is connected to the bus 39, and responds to the command supplied from the processor board 31 to drive servomotors 51, 52 and 53 through a servo amplifier 33. These servomotors are included in the machine tool and operate respective shafts or axes of the machine tool 1.

A serial port 34 is connected to the bus 39, and is further connected with an operating panel 54, and a RS232C apparatus 55. The operating panel 54 is used for manually operating the machine tool. Further, a CRT 36a is connected to the serial port.

An operating panel 36b is connected to a digital I/O 35. Output signals are supplied to the outside through the digital I/O 35 and an analog I/O 37. Further, program data, NC programs other than programs which are in use, and the like are stored in a mass memory 38, In the above, an explanation has been given as to the servo control circuit comprised of the digital servomotor control circuit 32, but the same is applied to an analog servomotor control circuit.

Figure 1:
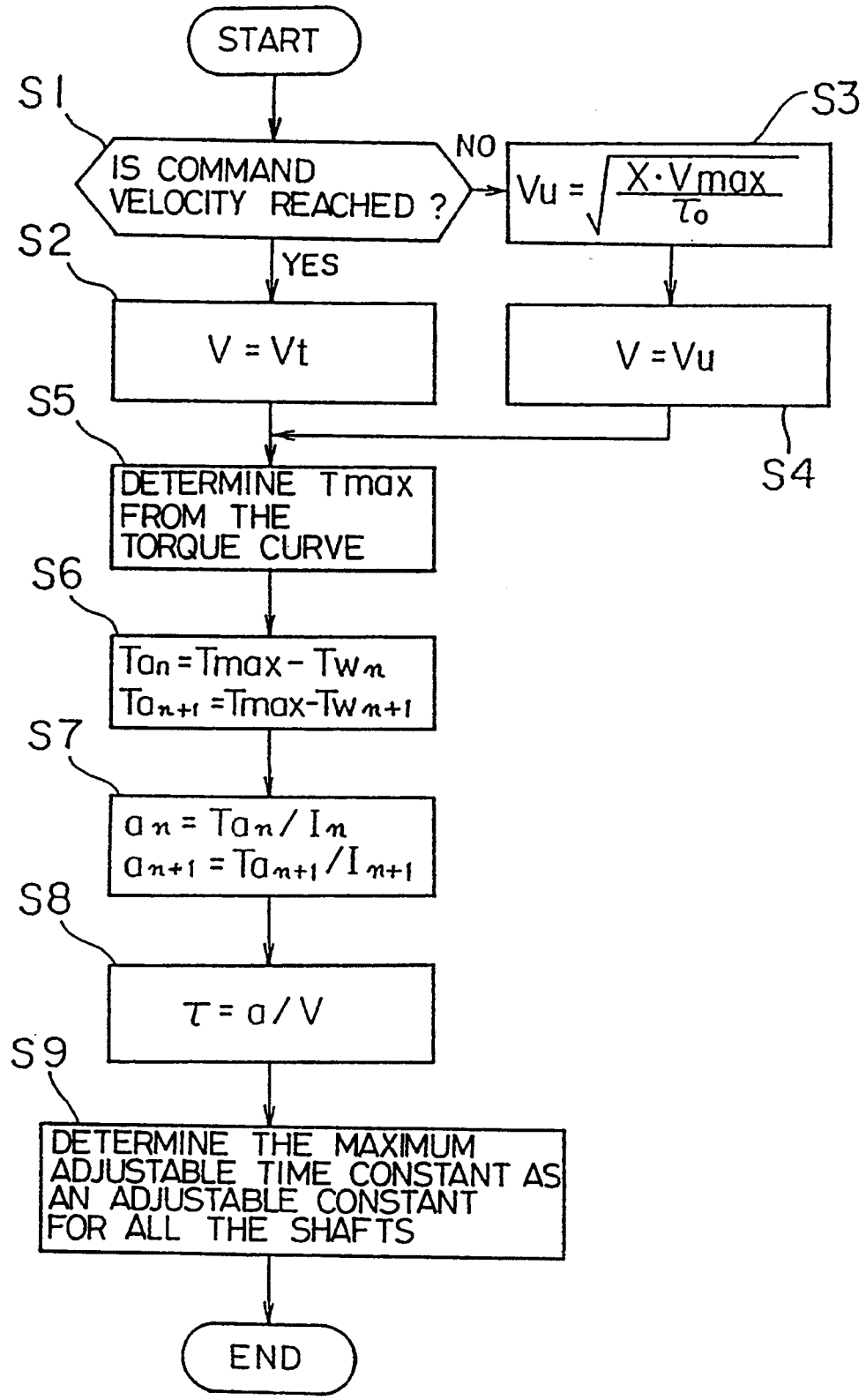
FIG. 1 is a flowchart showing an adjustable time constant control system for a servomotor according to the present invention.

FIG. 1 is a flowchart showing an accelerating and decelerating time constant control system for a servomotor. In the drawing, numerals which follow S each indicate a step number.

[S1] It is determined whether or not the velocity reaches the commanded velocity Vt on the basis of the distance to the target moving position, and if it reaches, the sequence advances to S2, or i f not so, the sequence advances to S3.

[S2] The commanded velocity Vt is determined as a velocity V.

[S3] A reaching velocity Vu is obtained by the following equation: (Assuming that the moving distance is X.)

$$Vu = (X \cdot Vmax/\tau_0)^{\frac{1}{2}}$$

[S4] The reaching velocity Vu is determined as the velocity V.

[S5] The maximum torque Tmax corresponding to the velocity V is determined on the basis of the torque curve shown in FIG. 3.

[S6] An accelerating torque Ta is calculated by subtracting the static load torque $T_w$ from the maximum torque Tmax. The accelerating torques $Ta_n$ and $Ta_{n+1}$ each of which is a function of a corresponding one of $T_{wn}$ and $T_{wn+1}$ are calculated, $T_{wn}$ and $T_{wn+1}$ respectively indicating static load torques of the current and target positions.

$$Ta_n = Tmax - T_{wn}$$

$$Ta_{n+1} = Tmax - T_{wn+1}$$

[S7] Acceleration $a_n$ and $a_{n+}$ are calculated each of which is a function of corresponding ones of the accelerating torques $Ta_n$, $Ta_{n+1}$ and the inertia $I_n$, $In_{n+1}$ at the current and target positions.

$$a_n = (Ta_n/I_n)$$

$$a_{n+1} = (Ta_{n+1}/I_{n+1})$$

In this case, a smaller one of $a_n$ and $a_{n+1}$ is determined as the acceleration a.

[S8] An accelerating/decelerating time constant or adjustable time constant $\tau$ is calculated on the basis of the acceleration a and the velocity V by the following equation:

$$\tau = a/V$$

The adjustable time constant, etc, for each program point in the programs can be adjusted by conducting multiplication where a constant A for minute adjustment is used as multiplier. Respective step for $S_1$ to $S_8$ is obtained every shaft.

[S9] The greatest $\tau$ among the time constants associated with the three shafts is determined as the adjustable time constant for each shaft, This is intended to make the adjustable time constant for each shaft assume the same value, so that the locus of the tip of a tool of the machine tool does not diverge from a programmed trace, In the meantime, an output torque of the servomotor can be calculated on the basis of the programmed velocity which is regarded as the velocity V, without executing the steps S1 through S4.

With respect to fast feeding where there is no need of making the adjustable time constants for all the shafts assume the same value, the optimum adjustable time constants for respective shafts can be determined.

Although the three-axis machine tool has been explained, by way of example, in the above, it is also possible to reduce a machining time in other types of machine tools, by adjusting the adjustable time constant to the optimum value. Further, the present invention is applicable to servomotors such as a spindle motor for positioning control of a spindle shaft in a similar manner.

As seen from the above descriptions, according to the present invention, the accelerating/decelerating time constant for each shaft is determined on the basis of the achievable velocity, inertia, or the like, so that the optimum accelerating/decelerating time constant can be determined, and hence the machining time can be shortened.

I claim:

1. A method for determining an adjustable time constant for a servomotor, comprising the steps of:
   a) determining whether the servomotor will reach a commanded velocity $V_t$, based on a movement distance X of the servomotor;
   b) setting the commanded velocity $V_t$ as a set velocity V if said step (a) determines that the servomotor will reach the commanded velocity $V_t$;
   c) determining a reaching velocity $V_u$'$(X \cdot V_{max}/\tau_0)^{\frac{1}{2}}$, $V_{max}$ being a maximum velocity of the servomotor and $\tau_0$ being a time constant corresponding to the maximum velocity $V_{max}$, if said step (a) determines that the servomotor will not reach the commanded velocity $V_t$;
   d) setting the reaching velocity $V_u$ as the set velocity V if said step (a) determines that the servomotor will not reach the commanded velocity $V_t$;
   e) determining a maximum torque $T_{max}$ based on a predetermined correspondence between velocity and torque of the servomotor, using the set velocity V;
   f) determining a current static load torque $Tw_n$ based on a current angular position $P_n$ of the servomotor;
   g) determining a current accelerating torque $Ta_n$ by subtracting the current static load torque $Tw_n$ from the maximum torque $T_{max}$;
   h) determining a current inertia $I_n$ of the servomotor based on the current angular position $P_n$;
   i) determining a current acceleration $a_n$ by dividing the current accelerating torque $Ta_n$ by the current inertia $I_n$;
   j) determining a target static load torque $Tw_{n+1}$ based on a target angular position $P_{n+1}$ of the servomotor;
   k) determining a target accelerating torque $Ta_{n+1}$ by subtracting the target static load torque $Tw_{n+1}$ from the maximum torque $T_{max}$;
   l) determining a target inertia $I_{n+1}$ of the servomotor based on the target angular position $P_{n+1}$;
   m) determining a target acceleration $a_{n+1}$ by dividing the target accelerating torque $Ta_{n+1}$ by the target inertia $I_{n+1}$;
   n) determining a smallest one of the current acceleration $a_n$ and the target acceleration $a_{n+1}$;
   o) determining the adjustable time constant by dividing the smallest one of the current acceleration $a_n$ and the target acceleration $a_{n+1}$, by the set velocity V; and
   p) controlling the servomotor based on the adjustable time constant for the servomotor determined in said step (o).

2. A method as claimed in claim 1, wherein the servomotor drives a workpiece, and the current static load torque $Tw_n$, the current inertia $I_n$, the target static load torque $Tw_{n+1}$ and the target inertia $I_{n+1}$, determined in said steps (d), (f), (h) and (j), respectively, are determined based on a weight of the workpiece.

3. A method as claimed in claim 1, wherein said steps (a)–(n) are repeated for each of a plurality of servomotors to determine a plurality of adjustable time constants for respective servomotors, further comprising the step of:
   q) determining a smallest one of the adjustable time constants as the adjustable time constant to be used to control the plurality of servomotors in said step (p).

4. A method of determining an adjustable time constant for a servomotor, comprising the steps of:
   a) determining whether the servomotor will reach a commanded velocity $V_t$, based on a movement distance X of the servomotor;
   b) setting the commanded velocity $V_t$ as a set velocity V if said step (a) determines that the servomotor will reach the commanded velocity $V_t$;
   c) determining a reaching velocity $V_u = (X \cdot V_{max}/\tau_0)^{\frac{1}{2}}$, $V_{max}$ being a maximum velocity of the servomotor and $\tau_o$ being a time constant corresponding to the maximum velocity $V_{max}$, if said step (a) determines that the servomotor will not reach the commanded velocity $V_t$;
   d) setting the reaching velocity $V_u$ as the set velocity V if said step (a) determines that the servomotor will not reach the commanded velocity $V_t$;
   e) determining a maximum torque $T_{max}$ based on a predetermined correspondence between velocity and torque of the servomotor, using the set velocity V;
   f) determining a static load torque $Tw_n$ based on an angular position $P_n$ of the servomotor;
   g) determining an accelerating torque $Ta_n$ by subtracting the static load torque $Tw_n$ from the maximum torque $T_{max}$;
   h) determining an inertia $I_n$ of the servomotor based on the angular position $P_n$;
   i) determining an acceleration $a_n$ by dividing the accelerating torque $Ta_n$ by the inertia $I_n$;
   j) determining the adjustable time constant by dividing the acceleration $a_n$ by the set velocity V; and
   k) controlling the servomotor based on the adjustable time constant for the servomotor determined in said step (j).

5. A method according to claim 4, wherein a plurality of servomotors are controlled by selecting a maximum value of said adjustable time constants of respective servomotors.

6. A method according to claim 4, wherein said adjustable time constants of respective servomotors are individually determined.

* * * * *

UNITED STATES PATENT AND TRADEMARK OFFICE
CERTIFICATE OF CORRECTION

PATENT NO. : 5,371,452
DATED : December 6, 1994
INVENTOR(S) : Tetsuaki KATO

It is certified that error appears in the above-indentified patent and that said Letters Patent is hereby corrected as shown below:

<u>TITLE PAGE</u>

TITLE [54] After "CONTROL" delete "AND METHOD SYSTEM" and insert therein --SYSTEM AND METHOD--.[75] After "Minamitsuru" insert ---Gun--.

[73] Delete "Yamanachi" and insert --Yamanashi--.

[57] Abstract, lines 10-11, delete "the command velocity ($V_l$), the command velocity ($V_l$).

[56] Line 5, delete "4,652,806" and insert --4,652,804--.

Column 1, line 2, delete "AND";

line 3, delete "METHOD SYSTEM" and insert --SYSTEM AND METHOD--.

Column 2, line 41, delete "o, a, b, c, and o" and insert --$\underline{o}$, $\underline{a}$, $\underline{b}$, $\underline{c}$, and $\underline{o}$--.

Column 2, line 43, delete "a and b" and insert --$\underline{a}$ and $\underline{b}$--.

Column 2, line 45, delete "a and b" and insert --$\underline{a}$ and $\underline{b}$--.

Column 2, line 47, delete "a and b" and insert --$\underline{a}$ and $\underline{b}$--.

UNITED STATES PATENT AND TRADEMARK OFFICE
CERTIFICATE OF CORRECTION

PATENT NO. : 5,371,452
DATED : December 6, 1994
INVENTOR(S) : Tetsuaki KATO

Page 2 of 3

It is certified that error appears in the above-indentified patent and that said Letters Patent is hereby corrected as shown below:

Column 2, line 52, delete "od" and insert --$\underline{od}$--.

Column 3, line 30, after "and" insert -- the moving--.

Column 4, line 1, delete "S" and insert --$\underline{S}$--.

Column 4, line 35, after "Ta$_n$" delete "," and insert --'--, and after "I$_n$" delete "," and insert --'--.

Column 4, line 43, delete "a" and insert --$\underline{a}$--.

Column 4, line 46, delete "a" and insert --$\underline{a}$--, also delete "V" and insert --$\underline{V}$--.

Column 4, line 53, delete "A" and insert --$\underline{A}$--.

Column 4, line 62, after "trace" delete "," and insert --.--.

Column 4, line 65, delete "V" and insert --$\underline{V}$--.

UNITED STATES PATENT AND TRADEMARK OFFICE
CERTIFICATE OF CORRECTION

PATENT NO. : 5,371,452
DATED : December 6, 1994
INVENTOR(S) : Tetsuaki KATO

It is certified that error appears in the above-indentified patent and that said Letters Patent is hereby corrected as shown below:

Column 5, line 27, after "$V_u$" delete "'" and insert --=--.

Signed and Sealed this

Twenty-first Day of March, 1995

BRUCE LEHMAN

Attest:

Attesting Officer       Commissioner of Patents and Trademarks